United States Patent
Obara

(10) Patent No.: US 6,684,023 B2
(45) Date of Patent: Jan. 27, 2004

(54) MULTIPLE CHANNEL IMAGE COMPRESSING AND RECORDING APPARATUS AND METHOD THEREFOR

(75) Inventor: Eiki Obara, Hiki-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 559 days.

(21) Appl. No.: 09/748,235

(22) Filed: Dec. 27, 2000

(65) Prior Publication Data

US 2001/0005450 A1 Jun. 28, 2001

(30) Foreign Application Priority Data

Dec. 27, 1999 (JP) ............................................. 11-370998

(51) Int. Cl.[7] ............................................... H04N 5/91
(52) U.S. Cl. ..................... 386/67; 386/107; 386/111; 386/112
(58) Field of Search ............................. 386/46, 67, 68, 386/107, 117, 111, 112, 125, 126; 358/906; 348/159

(56) References Cited

U.S. PATENT DOCUMENTS

| | | | | |
|---|---|---|---|---|
| 5,615,017 A | * | 3/1997 | Choi | 386/109 |
| 6,442,327 B1 | * | 8/2002 | Yamada et al. | 386/46 |
| 6,600,872 B1 | * | 7/2003 | Yamamoto | 386/67 |
| 6,606,448 B1 | * | 8/2003 | Terauchi | 386/46 |

* cited by examiner

*Primary Examiner*—Huy Nguyen
(74) *Attorney, Agent, or Firm*—Pillsbury Winthrop LLP

(57) ABSTRACT

In general, the inputted digital images of multiple channels are subjected to compressing and encoding utilizing a correlation between frames for each channel, and the compressed and encoded images are intermittently recorded in a recording medium. Then while a time interval of intermittent recording exceeds a predetermined value, digital images are subject to compressing and encoding in a frame, and are recorded in a recording medium. When compressing and encoding in a frame are performed for digital images, the digital images of multiple channels are recorded in a buffer memory in units of frames.

11 Claims, 3 Drawing Sheets

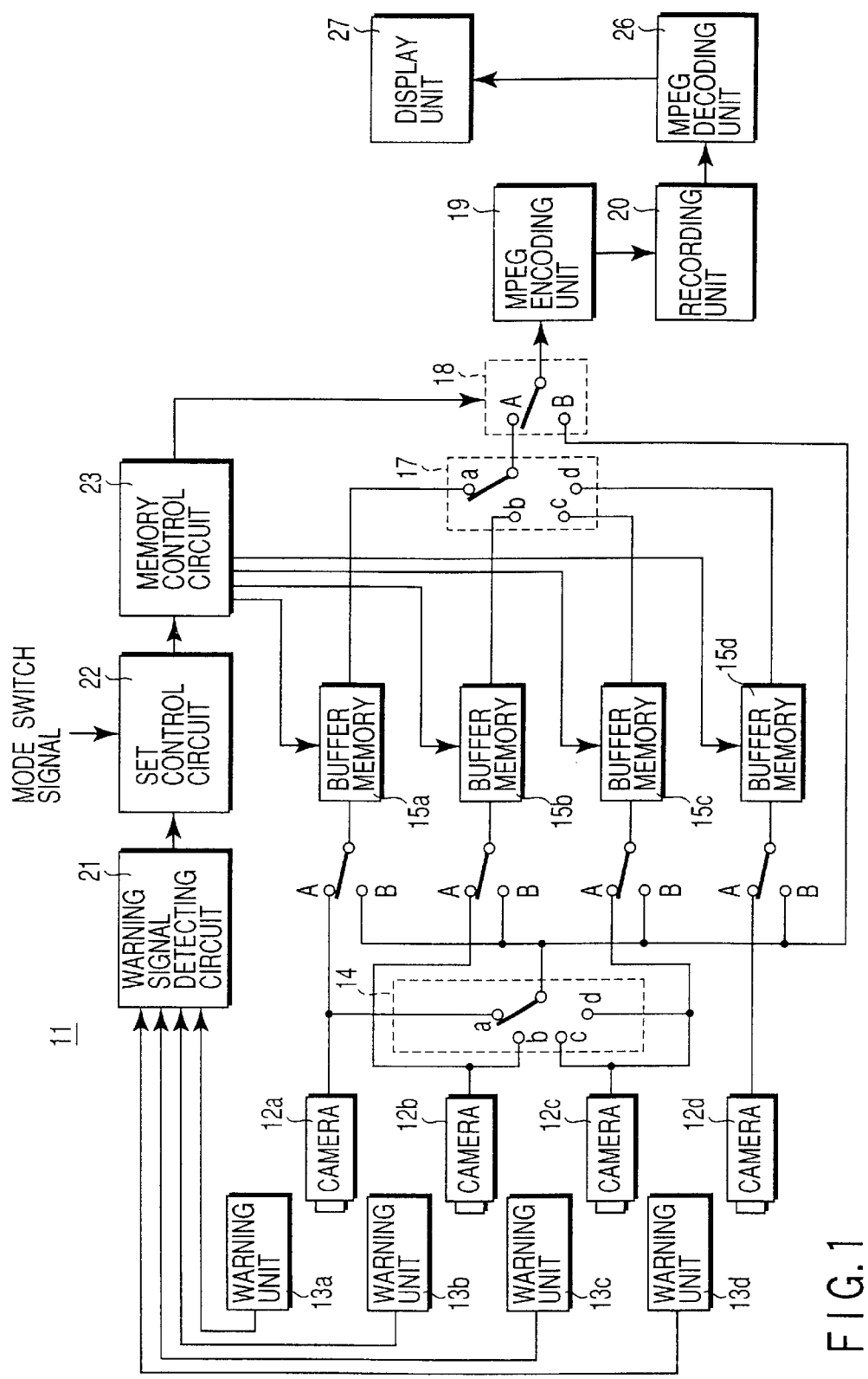
F I G. 1

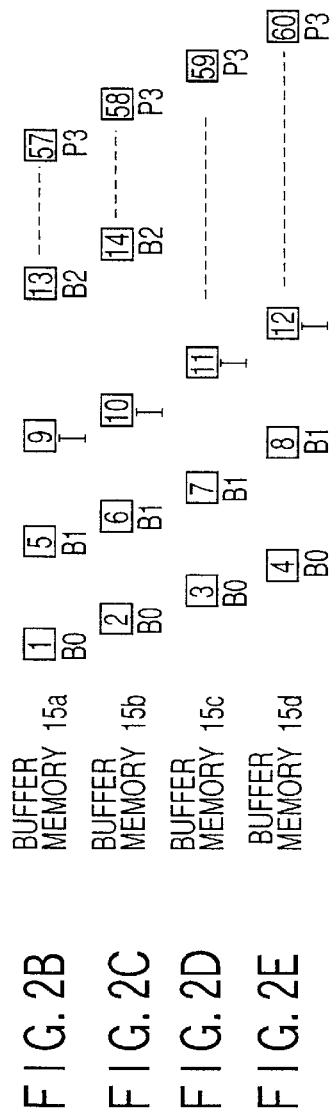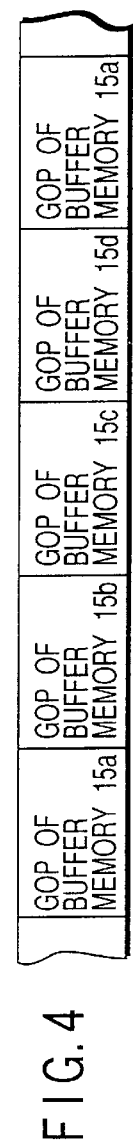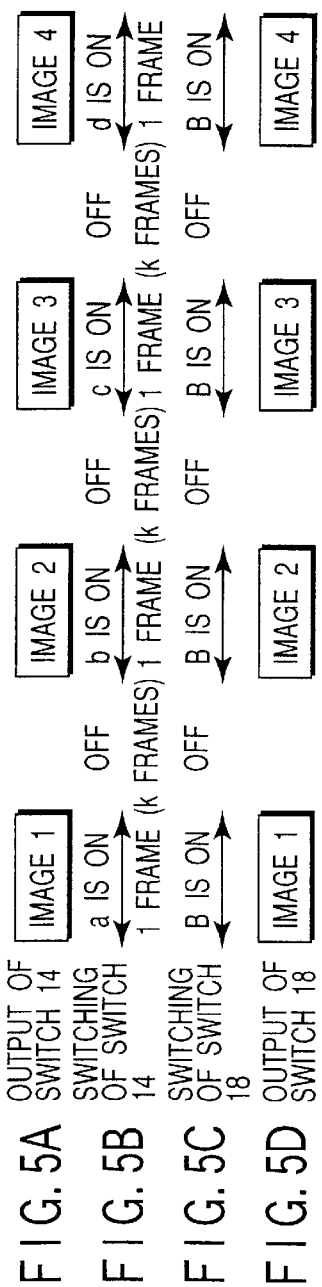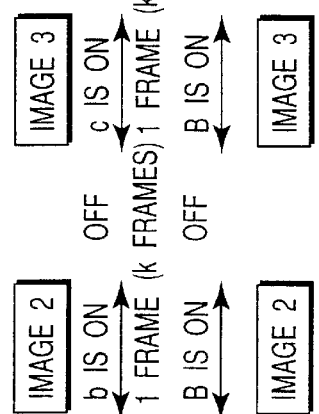

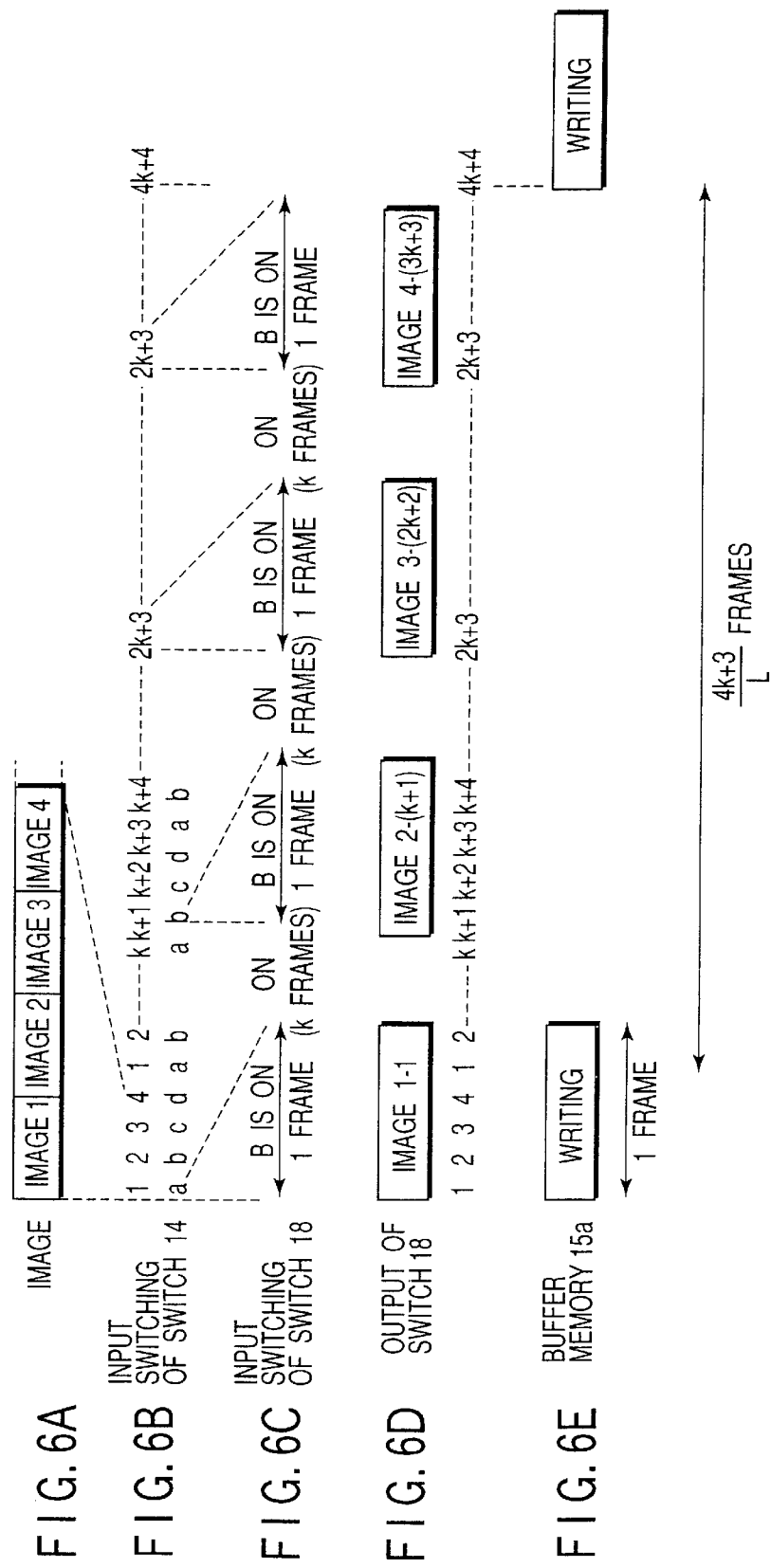

MULTIPLE CHANNEL IMAGE COMPRESSING AND RECORDING APPARATUS AND METHOD THEREFOR

CROSS-REFERENCE TO RELATED APPLICATIONS

This application is based upon and claims the benefit of priority from the prior Japanese Patent Application No. 11-370998, filed Dec. 27, 1999, the entire contents of which are incorporated herein by reference.

BACKGROUND OF THE INVENTION

The present invention pertains to a digital image compressing and recording apparatus. In particular, the present invention relates to a multiple channel image compressing and recording apparatus and its method for compressing and recording digital images for multiple channels.

As well known, in the case of recording an image used for the purpose of monitoring using a camera or the like, in general, it is required to record images over a long period of time. Thus, this recording requires a recording medium with its large capacity.

However, an image used in the case of such monitoring does not always need to be continuously recorded, and is often recorded intermittently for a need for reducing a recording capacity. Such recording is often called as time lapse recording.

For the purpose of monitoring or the like, there is many cases in which there are a plurality of monitoring sites. In such a case, a plurality of monitoring sites are intermittently monitored sequentially, and the intermittent images of multiple channels are transmitted or recorded.

On the other hand, with advancement of digital technology in recent years, an image is digitally processed. However, in order to obtain a digital image, it is required to record a large amount of information.

Therefore, in order to reduce an amount of information, there have been rapidly popular image compression techniques such as JPEG (Joint Photographic Experts Group) or MPEG (Moving Picture Image Coding Experts Group) for compressing an image utilizing image redundancy.

Thus, time lapse recording at a plurality of sites is performed by using digital technology, whereby an image can be compressed by utilizing image redundancy. In this case, as image compressing means, there is known time lapse recording using JPEG.

However, JPEG is a compression system disadvantageous in that the compression rate is not so high.

On the other hand, a correlation between frames can be obtained by using the MPEG technique. However, in the case of multiple channels, images before and after channel to be switched is an image at another monitoring site, and it is general that there is no correlation between images. Thus, there occurs inconvenience that, even if a correlation between frames is obtained, image compression is not made.

Because of this, the Applicant files an application for an image compressing apparatus comprising an image buffer memory for each channel, wherein a correlation between frames is obtained for each channel, whereby compressing and encoding such as MPEG can be performed (Japanese Patent Application No. 11-276922).

BRIEF SUMMARY OF THE INVENTION

It is an object of the present invention to provide a multiple channel image compressing and recording apparatus and method therefor capable of displaying a site in detail for a predetermined time even if an attempt is made to strengthen monitoring midway without degrading an image quality even if intermittent recording is performed over a very long time.

A multiple channel image compressing and recording apparatus according to the present invention comprises: an intermittently recording section for intermittently recording digital images of plurality of inputted channels in a memory in units of frames; a first compressing and recording section for performing compressing and encoding by obtaining a correlation between frames for each channel relevant to a digital image intermittently recorded in a memory in units of frames by this intermittent recording section while a time interval of intermittent recording is shorter than a predetermined value, and then, causing recording in a recording medium; and a second compressing and recording section for performing compressing and encoding in a frame relevant to digital images of multiple channels, and then, causing recording in a recording medium.

In addition, the multiple channel image compressing and recording apparatus according to the present invention comprises: a memory causing the inputted digital image of multiple channels to be intermittently recorded, respectively, for each channel in units of frames; a first compressing section for performing compressing and encoding by obtaining a correlation between frames for each channel relevant to the digital images intermittently recorded in this memory in units of frames; a second compressing section for performing compressing and encoding in a frame relevant to the digital images of multiple channels; and a recording section for recording an output of the first compressing section while a time interval of intermittent recording relevant to a memory is shorter than a predetermined value, and then, recording an output of the second compressing section while a time interval of intermittent recording exceeds a predetermined value.

Further, the multiple channel image compressing and recording method according to the present invention comprises: an intermittent recording step of intermittently recording the inputted digital images of multiple channels in a memory for each channel in units of frames; a first compressing and recording step of performing compressing and encoding by obtaining a correlation between frames for each channel relevant to the digital images intermittently recorded in a memory in units of frames by this intermittent recording step while a time interval of intermittent recording is shorter than a predetermined value, and then, causing recording in a recording medium; and a second compressing and recording step of performing compressing and encoding in a frame relevant to the digital images of multiple channels while a time interval of intermittent recording exceeds a predetermined value, and then, causing recording in a recording medium.

Furthermore, the multiple channel image compressing and recording method according to the present invention comprises: an intermittent recording step of intermittently recording inputted digital images of multiple channels in a memory in units of frames for each channel, respectively; a first compressing step of performing compressing and encoding by obtaining a correlation between frames for each channel relevant to the digital image intermittently recorded in a memory in units of frames by this intermittent recording step; a second compressing step of performing compressing and encoding in a frame relevant to the digital images of multiple channels; and a recording step of recording an output of the first compressing step while a time internal of intermittent recording relevant to a memory is shorter than a predetermined value, and then, recording an output of the second compressing step in a recording medium while a time interval of intermittent recording exceeds a predetermined value.

With the above arrangement and method, in general, compressing and encoding utilizing a correlation between frames relevant to digital images are performed, thereby causing recording in a recording medium. Then, the image data is compressed and encoded in a frame, thereby causing recording in a recording medium, while a time interval of intermittent recording exceeds a predetermined value. Thus even in the case where intermittent recording is performed over a very long time, an image quality is not degraded.

In addition, when the image data compressed and encoded in a frame, digital images of multiple channels are recorded in a memory in units of frames, thereby making it possible to see a desired site over a predetermined time in detail in the case where an attempt is made to strengthen monitoring midway.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram depicting one embodiment of a multiple channel image compressing and recording apparatus and method therefor according to the present invention;

FIG. 2A to FIG. 2E are views illustrating an operation for performing general compressing and encoding for an image obtained from each camera in the same embodiment, and then, causing recording;

FIG. 3 is a view illustrating an operation for performing general compressing and encoding in units of GOP for an image stored in a buffer memory in the same embodiment;

FIG. 4 is a view illustrating how the image stored in each buffer memory in the same embodiment is recorded in units of GOP;

FIG. 5A to FIG. 5D are views illustrating encoding in which only an I picture is obtained in the same embodiment; and FIG. 6A to FIG. 6E are views illustrating an operation for storing an image in each buffer memory in the same embodiment.

DETAILED DESCRIPTION OF THE INVENTION

Hereinafter, one embodiment of the present invention will be described in detail with reference to the accompanying drawing. FIG. 1 shows an image compressing and recording apparatus 11 described in this embodiment. That is, this image compression and recording apparatus 11 comprises: cameras 12a, 12b, 12c, and 12d installed at monitoring sites, for example; warning units 13a, 13b, 13c, and 13d installed respectively in the vicinity of these cameras 12a to 12d; a switch 14 for switching the images of each channel photographed by the four cameras 12a to 12d; buffer memories 15a, 15b, 15c, and 15d for storing the respective output images of the cameras 12a to 12d; a switch 16 for selectively switching the respective output images of the camera 12a to 12d and an output of the switch 14 to be outputted to buffer memories 15a to 15d; a switch 17 for switching the output images of the buffer memories 15a to 15d; a switch 18 for selectively switching an output of this switch 17 and an output of the switch 14; an MPEG encoding unit 19 for MPEG encoding an output of this switch 18; a recording unit 20 for recording an image compressed and encoded by the MPEG encoding unit 19 in a DVD (Digital Versatile Disc) or another type of recording medium that enables recording and reproduction of data; a warning signal detecting circuit 21 for detecting a warning signal outputted from the warning units 13a to 13d; a set control circuit 22 for switching a mode by an output of this warning signal detecting circuit 21 inputted and a mode switch signal to be additionally inputted; and a memory control circuit 23 being controlled by this set control circuit 22, the memory control circuit 23 changing an image storage mode to the buffer memories 15a to 15d, thereby controlling the switch 18.

An image compressed and recorded in the recording unit 20 is read during image reproduction, the read image is MPEG decoded by means of an MPEG decoding unit 26, and the decoded image is reproduced and displayed on a display unit 27.

Here an operation will be described with reference to FIG. 2A to FIG. 2E, FIG. 3, and FIG. 4 when MPEG2 encoding is performed in the case where the number N of pictures that configure 1GOP (Group Of Picture) that is a unit of MPEG encoding is 15, by employing a correlation between general frames. In this case, each terminal of the switch 16 is switched to a position B, respectively.

That is, by switching the above switch 14, the images photographed by the cameras 12a to 12d are stored respectively in the buffer memories 15a to 15d. When a frame number is assigned to an image as shown in FIG. 2A, the image of frame number 1 is stored in the buffer memory 15a as shown in FIG. 2B. The images of frame numbers 2, 3, and 4 are stored respectively in the buffer memory 15b as shown in FIG. 2C, the buffer memory 15c as shown in FIG. 2D, and the buffer memory 15d as shown in FIG. 2E.

Then, the images of frame numbers 5, 6, 7, and 8 are stored in the buffer memories 15a, 15b, 15c, and 15d, respectively. Similarly, the images of frame numbers 9, 10, 11, and 12 are stored respectively in the buffer memories 15a, 15b, 15c, and 15d.

In this manner, the switch 17 is set to the corresponding buffer memories 15a to 15d every time 15 images are stored in the buffer memories 15a to 15d.

For example when 15 images of frame numbers 1, 5, 9, 13, 17, 21, 25, 29, 33, 37, 41, 45, 49, 53, and 57 are stored in the buffer memory 15a as shown in FIG. 3, the switch 17 is set to the terminal 'a', and the switch 18 is set to the terminal A. Then, the above 15 images are supplied to the MPEG encoding unit 19, a frame correlation is obtained, and MPEG encoding is performed. In FIG. 3, types (B, P, and I) of pictures configuring 1GOP are described under each frame number.

In this manner, after 15 images have been stored in the buffer memory 15a, the 15 images are stored in the buffer memory 15b. Then, 15 images are stored in the buffer memory 15c, and are MPEG encoded sequentially in an MPEG encoding unit 19.

After these images have been encoded, a GOP is configured for each of the images stored in the buffer memories 15a to 15d, as shown in FIG. 4, and is stored in the recording unit 20.

In the meantime, in the case where the capacity of a recording medium in the recording unit 20 is small or in the case where the monitoring and recording time is very long, a time interval of intermittent recording becomes long.

In such a case, although the images photographed by the cameras 12a to 12d are small in correlation, in the case where compressing and encoding using frame correlation is performed, noise increases during reproduction.

In the present invention, in the case where a time interval of intermittent recording becomes long in excess of a predetermined value, only compressing and encoding in a frame are performed so as to obtain only I picture in spite of MPEG encoding.

Here, let us compare an amount of information on a recording image between a case using correlation between frames and a case in which only I picture is obtained. For example, in the case where compressing and encoding is performed with MPEG2 at GOP (N=15, M=3), it is possible that the average compression rate is set to about $1/35$. However, in recording by only I picture, the compression rate is about $1/8$ from the viewpoint of a reproduced image quality.

For example, let us consider a case in which 24-hour recording in a disk having its recording capacity of 4.7 GB (Giga Bytes) is performed while a 16-channel image input is switched. In this case, assuming that the signal processing is 4:2:0, and the resolution is 720×480, the total number of records is as follows.

4.7 GB/[720×480×1.5×($1/8$)×16]≈4533

Thus, the number of records in units of channels is as follows.

4533/3600 seconds×24 hours≈0.05 piece/second

The number of records in units of channels is about 1 frame per about 20 seconds, which is insufficient for use in a monitoring system.

In the case where a time interval of intermittent recording is equal to or more than a predetermined time, encoding for obtaining only I picture is performed. This operation will be described with reference to FIG. 5A to FIG. 5D. In this case, a mode switch signal is supplied to a set control circuit 22, and the memory control circuit 23 switches the switch 18 to the terminal B.

As shown in FIG. 5B, the switch 14 is set to the terminal 'a' by one frame, and is turned OFF by 'k' frames. Then, the switch is set to the terminal 'b' by one frame, and is turned OFF by 'k' frames. Further, the switch is set to the terminal 'c' by one frame, and is turned OFF by 'k' frames. Furthermore, the switch is connected to the terminal 'd' by one frame.

By doing this, as shown in FIG. 5A, images by one frame is switched by the switch 14 in units of 'k+1' frames. Thus by the switch 18 to be switched to the terminal B at a timing as shown in FIG. 5C, the image as shown in FIG. 5D is supplied to the PEG encoding unit 19, and is compressed in a frame for each image. Then, an I picture is obtained, and is stored in the recording unit 20.

In FIG. 5A to FIG. 5D, although a slight delay actually occurs in view of timing, images are displayed by omitting this delay in order to clarify a correlation.

In the meantime, when encoding is thus performed for obtaining only an I picture, the buffer memories 15a to 15d are not used. Thus, the images obtained by the camera 12a to 12d are stored in the buffer memories 15a to 15d in this duration.

Specifically, the switch 16 is switched to the terminal A, and the images photographed by the cameras 12a to 12d are stored in the buffer memories 15a to 15d via the switch 16.

A description of this operation will be given with reference to FIG. 6A to FIG. 6E. As shown in FIG. 6A to FIG. 6E, the images obtained from the cameras 12a to 12d are supplied to the MPEG encoding unit 19 via the terminal B of the switch 18 by k frames, respectively. The supplied images are encoded by compression in a frame, and the I picture is obtained.

At this time, the buffer memories 15a to 15d are controlled by means of the above memory control circuit 23. The images photographed by the cameras 12a, 12b, 12c, and 12d are stored in the buffer memories 15a, 15b, 15c, and 15d, respectively.

Now, assuming that the number of frames that can be stored in the buffer memories 15a to 15 is defined as L, and the number of frames that is not recorded is defined as 'k', when the buffer memories 15a to 15d are assigned uniformly, the images obtained from the cameras 12a to 12d can be stored in the corresponding buffer memories 15a to 15d by frames of (4k+3)/L.

For example, when a warning signal is generated from any one of the warning units 13a to 13d, the warning signal is detected by the warning signal detecting circuit 21, and the warning units 13a to 13d that issue warning to the set control circuit 22 are notified.

Then, the memory control circuit 23 controls the corresponding buffer memories 15a to 15d; the switch 17 is switched to a terminal that corresponds to any one of the buffer memories 15a to 15d; and the switch 18 is set to the terminal A.

In this manner, there are read images photographed by the cameras 12a to 12d that correspond to the warning units 13a to 13d that issue warning, the images being stored in the buffer memories 15a to 15d.

The images read from these buffer memories 15a to 15d are displayed by means of the display unit 27, and a state immediately before such warning is issued can be checked.

In the foregoing embodiment, there has been described a case in which MPEG encoding is performed, the present invention is not limited to MPEG encoding. In general, encoding utilizing a frame correlation may be performed or encoding based in a frame may be performed when a time interval of intermittent recording is equal to or greater than a predetermined value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiple channel image compressing and recording apparatus, comprising:

intermittently recording means for intermittently recording inputted digital images of multiple channels in a memory in units of frames for each channel, respectively;

first compressing and recording means for performing compressing and encoding by obtaining a correlation between frames for each channel relevant to digital images intermittently recorded in said memory in units of frames by the intermittently recording means while a time interval of said intermittent recording is shorter than a predetermined value, then causing recording in a recording medium; and second compressing and recording means for performing compressing and encoding for the digital images of said multiple channels while the time interval of said intermittent recording exceeds the predetermined value, then causing recording in said recording medium.

2. A multiple channel image compressing and recording apparatus according to claim 1, wherein said second compressing and recording means performs compressing and encoding in a frame for the inputted digital images of said multiple channels, thereby causing recording in said recording medium, and records said inputted digital images of the multiple channels in said memory in units of frames.

3. A multiple channel image compressing and recording apparatus, comprising:

intermittently recording section for intermittently recording inputted digital images of multiple channels in a memory in units of frames for each channel, respectively;

first compressing and recording section for performing compressing and encoding by obtaining a correlation between frames for each channel relevant to digital images intermittently recorded in said memory in units of frames by the intermittently recording section while a time interval of said intermittent recording is shorter than a predetermined value, then causing recording in a recording medium; and second compressing and recording section for performing compressing and encoding for the digital images of said multiple channels while the time interval of said intermittent recording exceeds the predetermined value, then causing recording in said recording medium.

4. A multiple channel image compressing and recording apparatus, comprising:

a memory in which inputted digital images of multiple channels are intermittently recorded in units of frames for each channel, respectively;

first compressing means for performing compressing and encoding by obtaining a correlation between frames for each channel relevant to digital images intermittently recorded in the memory in units of frames;

second compressing means for performing compressing and encoding in a frame relevant to the digital images of said multiple channels; and recording means for recording an output of said first compressing means in a recording medium while a time interval of intermittent recording relevant to said memory is shorter than a predetermined value, and then, recording an output of said second compressing means in said recording medium while the time interval of said intermittent recording exceeds the predetermined value.

5. A multiple channel image compressing and recording apparatus according to claim 4, wherein said recording means records an output of said second compressing means in said recording medium while the time interval of said intermittent recording exceeds a predetermined vale, and records the inputted digital images of said multiple channels in said memory in units of frames.

6. A multiple channel image compressing and recording apparatus, comprising:

a memory in which inputted digital images of multiple channels are intermittently recorded in units of frames for each channel, respectively;

first compressing section for performing compressing and encoding by obtaining a correlation between frames for each channel relevant to digital images intermittently recorded in the memory in units of frames;

second compressing section for performing compressing and encoding in a frame relevant to the digital images of said multiple channels; and recording section for recording an output of said first compressing section in a recording medium while a time interval of intermittent recording relevant to said memory is shorter than a predetermined value, and then, recording an output of said second compressing section in said recording medium while the time interval of said intermittent recording exceeds the predetermined value.

7. The multiple channel image compressing and recording apparatus according to claim 1 or 4, wherein said recording medium is a DVD.

8. A multiple channel image compressing and recording method, comprising:

an intermittently recording step of intermittently recording inputted digital images of multiple channels in a memory in units of frames for each channel, respectively;

a first compressing and recording step of performing compressing and encoding by obtaining a correlation between frames for each channel relevant to digital images intermittently recorded in said memory in units of frames by the intermittently recording step while a time interval of said intermittent recording is shorter than a predetermined value, and then, causing recording in a recording medium; and a second compressing and recording step of performing compressing and encoding in a frame relevant to digital images of said multiple channels while the time interval of said intermittent recording exceeds the predetermined value, and then, causing recording in said recording medium.

9. A multiple channel image compression and recording method according to claim 8, wherein said second compressing and recording step performs compressing and encoding in a frame relevant to the inputted digital images of said multiple channels, thereby causing recording in said recording medium, and records said inputted digital image of multiple channels in said memory in units of frames.

10. A multiple channel image compressing and recording method, comprising:

an intermittently recording step of intermittently recording inputted digital images of multiple channels in a memory in units of frames for each channel, respectively;

a first compressing step of performing compressing and encoding by obtaining a correlation between frames for each channel relevant to digital images intermittently recorded in said memory in units of frames by the intermittently recording step;

a second compressing step of perform compressing and encoding in a frame relevant to the digital images of said multiple channels; and a recording step of recording an output of said first compressing step in a recording medium while a time interval of intermittent recording relevant to said memory is shorter than a predetermined value, and then, recording an output of said second compressing step in said recording medium while the time interval of said intermittent recording exceeds the predetermined value.

11. A multiple channel image compressing and recording method according to claim 10, wherein said recording step records an output of said second compressing step in said recording medium while a time interval of said intermittent recording exceeds a predetermined value, and records the inputted digital images of said multiple channels in said memory in units of frames.

* * * * *